United States Patent Office 3,133,967
Patented May 19, 1964

3,133,967
1-(3,4-DIALKOXY-PHENOL)-1-DIALKYLAMINO-3-
AND-4-PHENYL BUTANES
Ernst Seeger and August Kottler, Biberach an der Riss,
Germany, assignors to Boehringer Ingelheim G.m.b.H.,
Ingelheim (Rhine), Germany, a corporation of Germany
No Drawing. Filed Feb. 4, 1960, Ser. No. 6,622
6 Claims. (Cl. 260—570.5)

This is a continuation-in-part of copending application Serial No. 710,186, filed January 21, 1958, now abandoned, which in turn is a continuation-in-part of application Serial No. 630,454, filed December 26, 1956, now abandoned, and Serial No. 691,549, filed October 22, 1957, now abandoned, said abandoned application Serial No. 630,454 being in turn a continuation-in-part of application Serial No. 544,385, filed September 21, 1955, now abandoned.

This invention relates to novel tertiary amines having useful pharmacological properties and to their non-toxic acid addition salts and quarternary compounds.

More particularly, the present invention relates to tertiary amines having the general structural formulas

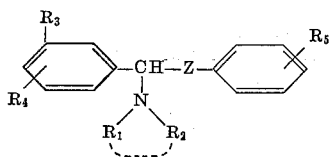

and

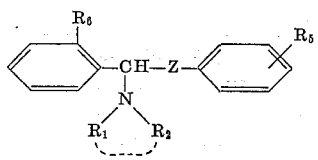

wherein $R_1$ and $R_2$ are alkyl with 1 to 6 carbon atoms, hydroxy-substituted alkyl with 1 to 6 carbon atoms, cyclohexyl, phenyl, benzyl or, together with each other and the adjacent nitrogen atom, form a heterocyclic radical, such as piperidyl, morpholyl, or pyrrolidyl,
$R_3$ is alkyl with 1 to 4 carbon atoms or alkoxy with 1 to 4 carbon atoms,
$R_4$ is 2-alkoxy with 1 to 4 carbon atoms, 4-alkoxy with 1 to 4 carbon atoms or 4-hydroxyl,
$R_5$ is hydrogen, alkyl with 1 to 3 carbon atoms or alkoxy with 1 to 3 carbon atoms,
$R_6$ is alkoxy with 1 to 4 carbon atoms and
Z is alkylene with 1 to 4 carbon atoms, and their non-toxic, pharmacologically useful acid addition salts and quaternary compounds.

The tertiary amines having the above structural Formulas I and II may be prepared by reacting α-tertiary amino-α-aryl-acetonitriles of the formulas

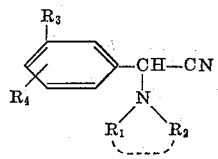

or

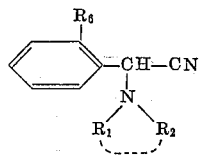

wherein $R_1$, $R_2$, $R_3$, $R_4$ and $R_6$ have the meanings previously defined, with an organo-magnesium halide of the formula

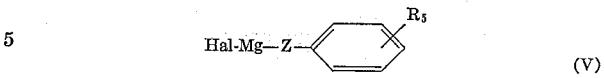

wherein Hal represents a halogen with an atomic weight from 35 to 127, inclusive, i.e. chlorine, bromine or iodine, and Z and $R_5$ have the meanings previously defined. The reaction between compounds III or IV and compound V is advantageously carried out in the presence of a suitable organic solvent, such as diethylether, dibutylether, benzene, tetrahydrofuran, or dioxan, or a mixture of such solvents. The preferred method consists of refluxing the reaction mixture at the boiling point of the particular solvent medium, although the reaction will also proceed at moderately elevated temperatures below the boiling point of the solvent and without reflux.

The resulting tertiary amines may be readily converted into their non-toxic acid addition salts or quaternary compounds by customary methods, as illustrated hereinafter.

The following examples will illustrate the preparation of various representative compounds of the group defined by Formulas I and II above and will enable others skilled in the art to understand the present invention more completely. It will be understood, however, that the invention is not limited to the particular compounds illustrated in these examples.

EXAMPLE 1

1-(4-Hydroxy-3-Methoxy-Phenyl)-1-Morpholyl-
(4)-4-Phenyl-Butane

A Grignard solution was prepared in the usual manner from 2.3 gm. magnesium turnings and 19.9 gm. phenyl-propyl-bromide in 30 cc. anhydrous ether. The ether was evaporated and 60 cc. benzene were added in its place. Thereafter, a solution of 8 gm. (4-hydroxy-3-methoxy-phenyl)-morpholyl-(4)-acetonitrile were added dropwise and the resulting mixture was heated under reflux for 6 hours. The reaction mixture was then decomposed by means of ice and hydrochloric acid. The benzene layer was separated and discarded. Some ammonium chloride was added to the aqueous layer which was then made alkaline by adding ammonia. The oil precipitated thereby was dissolved in ether and the resulting ethereal solution was dried over sodium sulfate. After evaporating the ether, 7 gm. of a compound having the structural formula

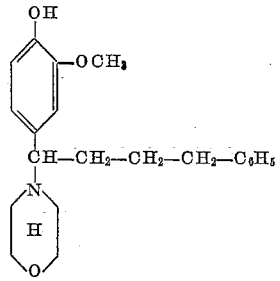

were obtained. On analysis, its nitrogen content was found to be 4.7% (calculated: 4.1%).
Its hydrochloride melted at 176° C.

EXAMPLE 2

1-(3,4-Dimethoxy-Phenyl)-1-Dibutylamino-4-Phenyl-
Butane 4.6 gm. (3,4-dimethoxy-phenyl)-dibutylamino-acetonitrile were dissolved in 30 cc. absolute ether and the resulting solution was added dropwise to a Grignard solution prepared from 1.10 gm. magnesium and 9.0 gm. phenyl-propyl-bromide in anhydrous ether. The resulting mixture was refluxed for 3 hours, cooled, and the reaction product was admixed with ice and 12% hydrochloric acid. The mixture separated into an ethereal and an aqueous phase. The ethereal phase was separated and discarded. Ammonium chloride and concentrated ammonia were added to the aqueous phase in an amount sufficient to make it alkaline. The oily substance precipitated thereby was extracted with ether, the ether extract solution was dried over sodium sulfate and the ether was evaporated. The residue was distilled in vacuo and yielded 4.5 gm. of an oily compound having the structural formula

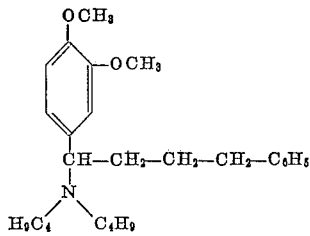

and a boiling point of 210° C. at 0.4 m. Hg.

The free base was converted with ethereal hydrochloric acid into its hydrochloride having a melting point of 139 to 140° C.

EXAMPLE 3

*1-(4-Methoxy-3-Methyl-Phenyl)-1-Dimethylamino-3-Phenyl-Butane*

A Grignard reagent was prepared by adding 4.6 gm. magnesium powder to 39.8 gm. β-phenyl-propyl bromide in absolute ether. After adding dropwise thereto a solution of 20.4 gm. (4-methoxy-3-methyl-phenyl)-dimethyl-amino-acetonitrile (boiling point is 165° C. at 15 mm. Hg) in 50 cc. absolute ether while continuously stirring, the mixture was refluxed for two hours. Upon cooling by adding cold water, the reaction mixture was decomposed by adding dilute hydrochloric acid until it was acid. The ethereal layer which formed was separated and discarded while the aqueous hydrochloric layer was made alkaline with ammonia. The oil which separated out was taken up in ether, the resulting ether solution was dried over sodium sulfate and the ether was driven off. The oily residue was distilled in vacuo, yielding a yellowish oily compound having the structural formula

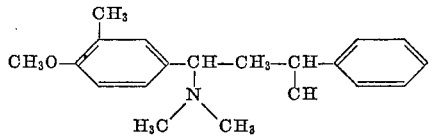

and a boiling point at 157° C. at 0.5 mm. The yield was 72%.

EXAMPLE 4

*1-(4-Methoxy-3-Methyl-Phenyl)-1-Piperidyl-2-Phenyl-Ethane*

A Grignard reagent was prepared by adding 4.6 gm. magnesium powder to 25.2 gm. benzylchloride in 50 cc. of a 1:1 mixture of benzene and tetrahydrofuran. After adding thereto dropwise a solution of 24.4 gm. (4-methoxy-3-methyl-phenyl)-piperidyl-acetonitrile (boiling point is 145 to 146° C. at 0.1 mm.) in 50 cc. of a mixture of equal parts of benzene and tetrahydrofuran while continuously stirring, the mixture was heated for 1½ hours at 60 to 70° C.

After cooling, water was added and then dilute hydrochloric acid until the mixture remained acid. The reaction mixture divided into an organic phase and an aqueous acid phase. The organic phase was separated and discarded, while the aqueous acid phase was made alkaline with ammonia. The oily precipitate formed thereby was taken up in benzene. A compound having the structural formula

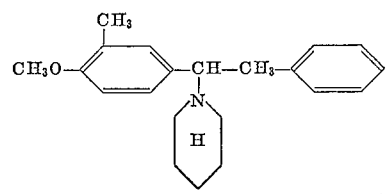

was obtained in the form of a yellowish oil having a boiling point of 170 to 171° C. at 0.5 mm. upon removal of the benzene by vacuum distillation. The yield was 71%. Its colorless hydrochloride, obtained by a precipitation with ethereal hydrochloric acid and recrystallization from acetone, melted at 180 to 181° C.

EXAMPLE 5

*1-(4-Ethoxy-3-Methoxy-Phenyl)-1-Dimethylamino-4-Phenyl-Butane*

A Grignard reagent prepared in the usual manner from 39.8 gm. α-phenyl-propyl-bromide and 4.6 gm. magnesium powder in absolute ether was reacted under the conditions described in Example 3 with 23.4 gm. (4-ethoxy-3-methoxy-phenyl)-dimethylamino-acetonitrile (melting point is 111 to 112° C.), suspended in 250 cc. absolute ether, by refluxing for 4 hours. A colorles oily compound having the structural formula

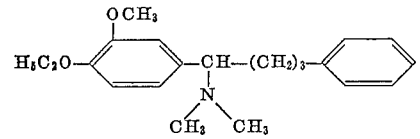

and a boiling point of 179 to 180° C. at 0.2 mm. Hg was obtained with a yield of 75% of theory. Its hydrochloride, which was produced by precipitation with ethereal hydrochloric acid from acetone, was a colorless crystalline substance melting at 135° C.

EXAMPLE 6

*1-(3,4-Diethoxy-Phenyl)-1-Dimethylamino-2-Phenyl-Ethane*

A Grignard solution prepared from 4.6 gm. magnesium powder and 25.2 gm. benzylchloride in absolute ether was reacted under the conditions described in Example 3 with a suspension of 24.8 gm. (3,4-diethoxy-phenyl)-dimethylamino-acetonitrile (melting point is 98 to 100° C.) in 250 cc. absolute ether. A yellowish oily compound having the structural formula

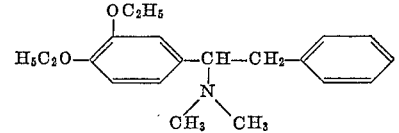

and a boiling point of 158° C. at 0.2 mm. Hg was obtained with a yield of 70% of theory. After recrystallization from acetone, its colorles hydrochloride salt melted at 161 to 163° C.

EXAMPLE 7

*1-(4-n-Butoxy-3-Methoxy-Phenyl)-1-Dimethylamino-4-Phenyl-Butane*

A Grignard compound, prepared from 1.8 gm. magnesium shavings and 15 gm. γ-phenyl-propyl-bromide in absolute ether was reacted under the conditions described in Example 3 with 13.1 gm. (4-n-butoxy-3-methoxy-phenyl)-dimethylamino-acetonitrile (boiling point is 140° C. at 0.3 mm. Hg) in ether. 9.5 gm. of a light yellowish oily compound having the structural formula

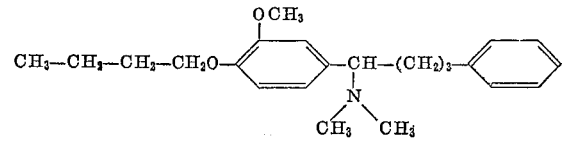

and a boiling point of 199° C. at 0.5 mm. Hg were obtained.

EXAMPLE 8

1-(3,4-Diethoxy-Phenyl)-1-Dimethylamino-4-Phenyl-Butane-Bromoethylate 2 gm. 1-(3,4-diethoxy-phenyl) - 1 - dimethylamino-4-phenyl-butane were heated for 2 hours under reflux in 40 cc. anhydrous acetone after addition of 3 gm. ethylbromide. Most of the acetone was then distilled off, and 75 cc. absolute ether were added. After standing for several hours in the cold, colorless crystals separated out which, after recrystallization from acetone, melted at 150° C. The yield was 1.9 gm.

EXAMPLE 9

1-(4-Ethoxy-3-Methoxy-Phenyl)-1-Dimethylamino-4-Phenyl-Butane-Sulfate 16.4 gm. 1-(4-ethoxy-3-methoxy-phenyl)-1-dimethylamino-4-phenyl-butane were dissolved in 50 cc. ether. While cooling and stirring, a mixture of 2.45 gm. concentrated sulfuric acid and 50 cc. ether were added to the solution. The salt which separated out solidified after standing in the cold. It was separated and recrystallized from an acetone-ether mixture, whereupon it took the form of colorless crystals having a melting point of 84 to 86° C. (decomp.).

EXAMPLE 10

1-(3,4-Diethoxy-Phenol)-1-Pyrrolidyl-2-(4-Methyl-Phenyl)-Ethane-Phthalate 13.5 gm. 1-(3,4-diethoxy-phenyl)-1-pyrrolidyl - 2 - (4-methyl phenyl)-ethane, dissolved in 30 cc. isopropanol, were added to a solution of 6.3 gm. phthalic acid in about 30 cc. isopropanol, and the resulting mixture was heated to about 40° C. for a short time. After cooling, a small amount of ether was added and the mixture was placed into a refrigerator where the resulting precipitate crystallized. Upon recrystallization from an ethanol-ether mixture, colorless crystals having a melting point of 112° C. were obtained.

EXAMPLE 11

1-(4-Ethoxy-3-Methoxyphenyl)-1-Dimethylamino-2-Phenyl-Ethane-Citrate 2 gm. citric acid, dissolved in isopropanol, were added to an isopropanol solution of 3 gm. 1-(4-ethoxy-3-methoxy-phenyl)-1-dimethylamino-2-phenyl-ethane. The mixture was heated for 10 minutes at 40 to 50° C. The precipitate which formed upon cooling was separated in the form of an amorphous mass which crystallized when triturated with ether. The yield was 3.5 gm.

EXAMPLE 12

1-(2,3-Dimethoxy-Phenyl)1-Diethylamino-4-Phenyl-Butane 24.8 gm. (2,3-dimethoxy-phenyl)-diethylamino-acetonitrile (melting point at 54° C.), dissolved in 50 cc. absolute ether, were added dropwise while stirring to a Grignard reagent prepared from 4.8 gm. magnesium powder and 39.8 gm. γ-phenyl-propyl-bromide in 50 cc. absolute ether. On completion of the addition the reaction mixture was refluxed for two hours. The reaction mixture was then decomposed by adding cold water and dilute hydrochloric acid thereto until it was acid. The mixture divided into an etheral phase and an aqueous acid phase. The ethereal phase was separated and discarded and ammonia was added to the aqueous acid phase to make it alkaline. The oil which separated out was dissolved in ether, the resulting solution was dried over sodium sulfate and then the solvent was driven off. The residue was distilled in vacuo, yielding a yellowish oily compound having the structural formula

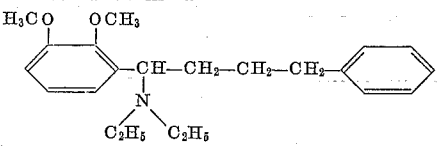

and a boiling point of 164° C. at 0.35 mm. Hg with a yield of 76% of theory. Its colorless hydrochloride was precipitated from ethereal hydrochloric acid and recrystallized from acetone, whereupon it melted at 133 to 134° C.

EXAMPLE 13

1-(2-Ethoxy-Phenyl)-1-Piperidyl-3-Phenyl-Propane 24.4 gm. (2 - ethoxy - phenyl) - piperidyl - acetonitrile (melting point at 78° C.) in 50 cc. of a mixture of benzene and tetrahydrofuran (1:1) were added dropwise to a Grignard reagent prepared from 4.8 gm. magnesium powder and 37 gm. β-phenyl-ethyl bromide in 50 cc. of a mixture of benzene and tetrahydrofuran (1:1). The reaction mixture was then heated for 1½ hours at 70° C. After cooling, water and dilute hydrochloric acid were added until the reaction mixture remained acid. The solution divided into an organic phase and an aqueous acid phase. The organic solvent phase was separated and the solvent distilled off. The residue was made alkaline with ammonia and the precipitate formed thereby was dissolved in benzene. The residue remaining after the evaporation of the benzene by distillation in vacuo was a yellowish compound having the structural formula

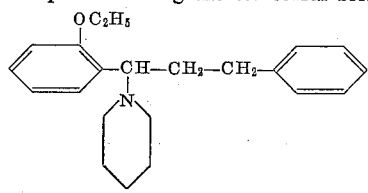

and a boiling point of 159 to 161° C. at 0.3 mm. Hg. The yield was 75% of theory.

Its colorless hydrochloride, obtained by precipitation from ethereal hydrochloric acid and recrystallization from acetone, melted at 122 to 123° C.

EXAMPLE 14

1-(2,3-Dimethoxy-Phenyl)-1-Diethylamino-3-Phenyl-Propane 24.8 gm. (2,3-dimethoxy-phenyl)-1-diethylamino-acetonitrile, dissolved in 50 cc. of a mixture of tetrahydrofuran and benzene (1:1), was added dropwise, while stirring, to a Grignard reagent prepared from 4.8 gm. magnesium powder and 37 gm. β-phenyl-ethyl bromide in 50 cc. of a mixture of tetrahydrofuran and benzene (1:1), and the resulting reaction mixture was heated for 1.5 hours at 70° C. The reaction mixture was then admixed with water and dilute hydrochloric acid, whereby it divided into an organic phase and an aqueous acid phase. The organic solvent phase was separated and discarded and the aqueous hydrochloric acid phase was made alkaline with ammonia. The oil which separated was dissolved in benzene. The residue remaining after evaporation of the benzene by distillation in vacuo yielded a yellowish oily compound having the structural formula

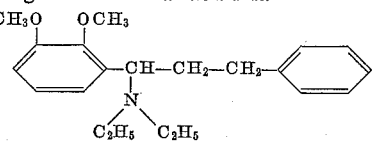

and a boiling point of 148° C. at 0.08 mm. Hg. The yield was 37% of theory.

Its colorless hydrochloride, recrystallized from acetone, melted at 156° C.

EXAMPLE 15

1-(2-Ethoxy-3-Methoxy-Phenyl)-1-Morpholyl-2-Phenyl-Ethane

The ether was evaporated from an ethereal solution of a Grignard reagent prepared from 4.8 gm. magnesium powder and 25.2 gm. benzyl chloride in 50 cc. absolute ether and replaced by the same quantity of absolute benzene. 27.6 gm. (2-ethoxy-3-methoxy-phenyl)-morpholylacetonitrile (boiling point at 155° C. at 0.4 mm. Hg), dissolved in 50 cc. absolute benzene, were then added dropwise and the resulting mixture was heated for about 1 hour at 70° C. The reaction mixture was then admixed with water and dilute hydrochloric acid, whereby it divided into an organic phase and an aqueous acid phase. The organic solvent phase was separated and discarded and the aqueous hydrochloric acid phase was dissolved in benzene, the benzene was evaporated and the residue was distilled in vacuo. A yellowish oily compound having the structural formula

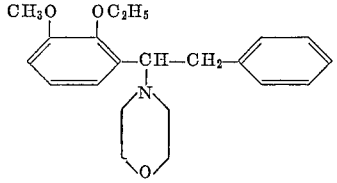

and a boiling point of 168 to 169° C. at 0.4 mm. Hg was obtained with a yield of 40% of theory. Its hydrochloride, recrystallized from acetone, melted at 155 to 156° C.

EXAMPLE 16

*1-(2,3-Dimethoxy-Phenyl)-1-Diethylamino-3-Phenyl-Propane Methoiodide*

3 gm. methyl iodide were added to a solution of 6.4 gm. 1-(2,3-dimethoxy-phenyl)-1-diethylamino-3-phenyl-propane, in 50 cc. of absolute acetone, and the resulting mixture was heated under reflux for 4 hours on a water bath. The acetone was then evaporated and the oily residue was triturated with ether. Crystallization set in after a short time. The crystalline product was separated on a vacuum filter and recrystallized from acetone. The quaternary salt had a melting point of 158° C. The yield was 7 gm., which is 76% of theory.

EXAMPLE 17

*1-(2-Methoxy-Phenyl)-1-Dimethylamino-3-Phenyl-Propane Benzylobromide*

5.2 gm. 1 - (2 - methoxy-phenyl)-1-dimethylamino-3-phenyl-propane were dissolved in 50 cc. absolute acetone, 4 gm. benzyl bromide were added to the solution and the mixture was heated under reflux for about 4 hours on a water bath. The acetone was then distilled off, the oily residue was triturated several times with ether, and allowed to crystallize. The crystals were separated on a vacuum filter. The crystalline quaternary salt had a melting point of 125 to 127° C. The yield was 5.2 gm., which is 65% of theory.

The following table illustrates additional tertiary amines having the structural Formulas I and II above which were produced, and lists the boiling point of the free base, the melting point of the corresponding hydrochloride addition salt, the acetonitrile and Grignard reagents used in their preparation, the reaction procedure and the yield in each case.

| Example No. | Tertiary amine produced | M.P., °C. | B.P., °C./mm. Hg | M.P. of hydrochloride, °C. | Acetonitrile reagent | Grignard reagent from magnesium and— | Reaction procedure as in Example No.— | Yield percent of theory |
|---|---|---|---|---|---|---|---|---|
| 18 | 1-(3,4-dimethoxy-phenyl)-1-pyrrolidyl-4-phenyl-butane. | | 215/0.6 | | (3,4-dimethoxy-phenyl)-pyrrolidyl-acetonrile. | γ-Phenyl-propyl-bromide. | 2 | 81 |
| 19 | 1-(4-hydroxy-3-methoxy-phenyl)-1-dimethyl-amino-4-phenyl-butane. | 106 (recrystallized from CH₃OH). | | 146 | (4-hydroxy-3-methoxy-phenyl))-dimethyl-amino-acetonitrile. | do | 2 | 45 |
| 20 | 1-(4-hydroxy-3-methoxy-phenyl)-1-dimethyl-amino-2-(4-methyl-phenyl)-ethane. | | | 126 | do | p-Xylyl-bromide. | 2 | 48 |
| 21 | 1-(4-hydroxy-3-methoxy-phenyl)-1-pyrrolidyl-4-phenyl-butane. | | | 160 | (4-hydroxy-3-methoxy-phenyl)-pyrrolidyl-acetonitrile. | γ-Phenyl-propyl-bromide. | | 65 |
| 22 | 1-(4-hydroxy-3-methoxy-phenyl)-1-piperidyl-2-phenyl ethane. | 141 (recrystallized from C₂H₅OH). | | 165 | (4-hydroxy-3-methoxy-phyenyl)-piperidyl-acetonitrile. | Benzyl chloride. | 2 | 70 |
| 23 | 1-(4-hydroxy-3-methoxy-phenyl)-1-piperidyl-3-phenyl-propane. | 111 (recrystallized from C₂H₅OH). | | 186 | do | β-Phenyl-ethyl bromide. | 2 | 60 |
| 24 | 1-(4-hydroxy-3-methoxy-phenyl)-1-piperidyl-4-phenyl-butane. | 103-104 | | 120 | do | γ-Phenyl-propyl-bromide. | 2 | 50 |
| 25 | 1-(4-hydroxy-3-methoxy-phenyl)-1-piperidyl-5-phenyl-pentane. | 113-114 (recrystallized from C₂H₅OH). | | | do | Δ-Phenyl-butyl-chloride. | 2 | 46 |
| 26 | 1-(3,4-dimethoxy-phenyl)-1-dimethyl-amino-4-phenyl-butane. | | 166-168/0.1 | 138-139 | (3,4-dimethoxy-phenyl)-dimethylamino-acetonitrile. | γ-Phenyl-propyl-bromide. | 2 | 85 |
| 27 | 1-(3,4-dimethoxy-phenyl)-1-dimethyl-amino-3-methyl-3-phenyl-propane. | | 156/0.3 | 213 | do | β-Bromo-isopropyl-benzene. | 2 | 52 |
| 28 | 1-(3,4-dimethoxy-phenyl)-1-piperidyl-4-phenyl-butane. | | 200/0.1 | 158 | (3,4-dimethoxy-phenyl)-piperidyl-acetonitrile. | γ-Phenyl-propyl-bromide. | 2 | 66 |
| 29 | 1-(4-hydroxy-3-methoxy-phenyl)-1-dimethyl-amino-2-phenyl-ethane. | 125 (triturated with petroleum ether). | | | (4-hydroxy-3-methoxy-phenyl)-dimethyl-amino-aceonitrile. | Benzyl-chloride. | 2 | 65 |
| 30 | 1-(4-hydroxy-3-methoxy-phenyl)-1-piperidyl-2-(4-methyl-phenyl)-ethane. | 78 (recrystallized from CH₃OH.) | | 175 | (4-hydroxy-3-methoxy-phenyl)-piperidyl-acetonitrile. | p-Xylyl-bromide. | 2 | 67 |
| 31 | 1-(3,4-dimethoxy-phenyl)-1-dimethyl-amino-2-phenyl-ethane. | | 151/0.1 | 192 | (3,4-dimethoxy-phenyl)-dimethylamino-acetonitrile. | Benzyl cholride. | 1 | 73 |
| 32 | 1-(3,4-dimethoxy-phenyl)-1-dimethyl-amino-3-phenyl-propane. | | 165/0.2 | | do | β-Phenylethyl bromide. | 1 | 51 |
| 33 | 1-(3,4-dimethoxy-phenyl)-1-dimethyl-amino-3-methyl-3-phenyl-propane. | | 165/0.2 | 213 (recrystallized from ethanol ether). | do | β-Bromo-iso-propyl-bromide. | 1 | 70 |

| Example No. | Tertiary amine produced | M.P., °C. | B.P., °C./mm. Hg | M.P. of hydrochloride, °C. | Acetonitrile reagent | Grignard reagent from magnesium and— | Reaction procedure as in Example No.— | Yield percent of theory |
|---|---|---|---|---|---|---|---|---|
| 34 | 1-(3,4-dimethoxy-phenyl)-1-dimethyl-amino-2-(4-methoxy-phenyl)-ethane. | | 173/0.15 | | (3,4-dimethoxy-phenyl)-dimethylamino-acetonitrile. | p-Bromo-anisole | 1 | 95 |
| 35 | 1-(3,4-dimethoxy-phenyl)-1-diethyl-amino-4-phenyl-butane. | | 168/0.05 | 138 | (3,4-dimethoxy-phenyl)-diethyl-amino-acetonitrile. | γ-Phenyl-propyl-bromide. | 1 | 66 |
| 36 | 1-(3,-methyl-4-methoxy-phenyl)-1-dimethyl-amino-3-phenyl-propane. | | 143/0.2 | 170 | (3-methyl-4-methoxy-phenyl)-dimethyl-amino-acetonitrile. | β-Phenyl-ethyl bromide. | 3 | 74 |
| 37 | 1-(3-ethoxy-4-methoxy-phenyl)-1-dimethyl-amino-3-methyl-3-phenyl-propane. | | 153–154/0.35 | | (3-ethoxy-4-methoxy-phenyl)-dimethyl-amino-acetonitrile. | β-Bromo-propyl-benzene. | 3 | 83 |
| 38 | 1-(3,4-diethoxy-phenyl)-1-diethyl-amino-4-phenyl-butane. | | 176/0.4 | 135–136 | (3,4-diethoxy-phenyl)-diethylamino-acetonitrile. | γ-Phenyl-propyl-bromide. | 5 | 41 |
| 39 | 1-(3-methoxy-4-ethoxy-phenyl)-1-pyrrolidyl-4-phenyl-butane. | | 183/0.3 | 154–155 | (3-methoxy-4-ethoxy-phenyl)-pyrrolidyl-acetonitrile. | ----do---- | 5 | 57 |
| 40 | 1-(3,4-diethoxy-phenyl)-1-diethyl-amino-3-methyl-3-phenyl-propane. | | 165/0.25 | | (3,4-diethoxy-phenyl)-diethylamino-acetonitrile. | β-Bromo-propyl-benzene. | 3 | 72 |
| 41 | 1-(3-methoxy-4-ehoxy-phenyl)-1-diethyla-mino-4-phenyl-butane. | | 183/0.45 | 150–151 | (3-methoxy-4-ethoxy-phenyl)-diethyla-mino-acetonitrile. | α-Phenyl-propyl-bromide. | 5 | 65 |
| 42 | 1-(3,4-diethoxyphenyl)-1-pyrrolidyl-2-p-tolyl-ethane. | | 167/0.25 | 185–186 | (3,4-diethoxyphenyl)-pyrrolidyl-acetonitrile. | Xylyl bromide | 5 | 65 |
| 43 | 1-(3,4-diethoxy-phenyl)-1-piperidyl-4-phenyl-butane. | | 195/0.25 | 152–153 | 3,4-diethoxyphenyl)-piperidyl-acetonitrile. | γ-Phenyl-propyl-bromide. | 3 | 82 |
| 44 | 1-(3-ethoxy-4-methoxy-phenyl)-1-dimethyl-amino-4-phenyl-butane. | | 182/0.5 | 126 | (3-ethoxy-4-methoxy-phenyl)-dimethyl-amino-acetonitrile. | do | 3 | 60 |
| 45 | 1-(3,4-diethoxy-phenyl)-1-diethylamino-3-phenylpropane. | | 171/0.3 | 136 | (3,4-diethoxyphenyl)-diethylamino-acetonitrile. | β-Phenyl-ethylbromide. | 5 | 82 |
| 46 | 1-(3-ethoxy-4-methoxy-phenyl)-1-diethyl-amino-4-phenyl-butane. | | 181/0.45 | 139 | (3-ethoxy-4-methoxy-phenyl)-diethylamino-acetonitrile. | γ-Phenyl-propyl-bromide. | 3 | 70 |
| 47 | 1-(3-ethoxy-4-methoxy-phenyl)-1-diethyl-amino-3-methyl-3-phenyl-propane. | | 164/0.35 | | ----do---- | β-Phenyl-propyl-bromide. | 5 | 70 |
| 48 | 1-(3-methyl-4-methoxy-phenyl)-1-dimethyl-amino-2-phenyl-ethane. | | 137/0.1 | 187 | (3-methyl-4-methoxy-phenyl)-dimethyl-amino-acetonitrile. | Benzyl bromide | 3 | 68 |
| 49 | 1-(3-methyl-4-methoxy-phenyl)-1-dimethyl-amino-4-phenyl-butane. | | 151/0.2 | 185–186 | ----do---- | γ-Phenyl-propyl-bromide. | 3 | 66 |
| 50 | 1-(3-methyl-4-methoxy-phenyl)-1-diethyl-amino-4-phenyl-butane. | | 169/0.45 | 148–149 | (3-methyl-4-methoxy-phenyl)-diethylamino-acetonitrile. | ----do---- | 3 | 68 |
| 51 | 1-(3-methyl-4-methoxy-phenyl)-1-pyrrolidyl-2-phenyl-ethane. | | 142/0.04 | 203 | (3-methyl-4-methoxy-phenyl)-pyrrolidyl-acetonitrile. | Benzyl bromide | 3 | 61 |
| 52 | 1-(3-methoxy-4-ethoxy-phenyl)-1-dimethyl-amino-2-phenyl-ethane. | | 153/0.3 | 174–176 | (3-methoxy-4-ethoxy-phenyl)-dimethyl-amino-acetonitrile. | ----do---- | 5 | 65 |
| 53 | 1-(3-methoxy-4-ethoxy-phenyl)-1-dimethyl-amino-3-methyl-3-phenyl-propane. | | 154–155/0.25 | | ----do---- | β-Phenyl-propyl-bromide. | 5 | 77 |
| 54 | 1-(3-methoxy-4-ethoxy-phenyl)-1-diethyl-amino-3-methyl-3-phenyl-propane. | | 171/0.4 | | (3-methoxy-4-ethoxy-phenyl)-diethyl-amino-acetonitrile. | ----do---- | 3 | 76 |
| 55 | 1-(3-methoxy-4-ethoxy-phenyl)-1-piperidyl-4-phenyl-butane. | | 205–206/0.3 | | (3-methoxy-4-ethoxy-phenyl)-piperidyl-acetonitrile. | γ-Phenyl-propyl-bromide. | 5 | 77 |
| 56 | 1-(3-methoxy-4-ethoxy-phenyl)-1-piperidyl-3-methyl-3-phenyl-propane. | | 185/0.3 | | ----do---- | β-Phenyl-propyl-bromide. | 5 | 71 |
| 57 | 1-(3,4-diethoxy-phenyl)-1-dimethyl-amino-4-phenyl-butane. | | 153/0.06 | 128–129 | (3,4-diethoxy-phenyl)-dimethylamino-acetonitrile. | γ-phenyl-propyl bromide. | 5 | 60 |
| 58 | 1-(3,4-diethoxy-phenyl)-1-dimethyl-amino-3-methyl-3-phenyl-propane. | | 160/0.3 | | ----do---- | β-Phenyl-propyl bromide. | 5 | 78 |
| 59 | 1-(3,4-diethoxy-phenyl)-1-pyrrolidyl-2-p-tolyl-ethane. | | 167/0.25 | | (3,4-diethoxy-phenyl)-pyrrolidyl-acetonitrile. | Xylyl bromide | 5 | 65 |
| 60 | 1-(3-methoxy-4-n-propoxy-phenyl)-1-dimethylamino-3-phenyl-propane. | | 168/0.3 | | (3-methoxy-4-n-propyl-phenyl)-dimethyl-amino-acetonitrile. | β-Phenyl-ethyl-bromide. | 3 | 55 |
| 61 | 1-(3,-methoxy-4-isopropoxy-phenyl)-1-pyrrolidyl-2-phenyl-ethane. | | 163/0.3 | | (3-methoxy-4-isopropoxy-phenyl)-pyrrolidyl-acetonitrile. | Benzyl bromide | 3 | 68 |

| Example No. | Tertiary amine produced | M.P., °C. | B.P., °C./mm. Hg | M.P. of hydrochloride, °C. | Acetonitrile reagent | Grignard reagent from magnesium and— | Reaction procedure as in Example No.— | Yield percent of theory |
|---|---|---|---|---|---|---|---|---|
| 62 | 1-(2,3-diethoxy-phenyl)-1-dimethylamino-3-phenyl-3-methyl-propane. | | 145/0.3 | | (2,3-diethoxy-phenyl)-dimethylamino-acetonitrile. | β-Phenyl-propyl bromide. | 12 | 75 |
| 63 | 1-(2,3-diethoxy-phenyl)-1-dimethylamino-4-phenyl-butane. | | 165/0.4 | | ___do___ | γ-Phenyl-propyl-bromide. | 12 | 61 |
| 64 | 1-(2,3-dimethoxy-phenyl)-1-dimethyl-amino-3-methyl-3-phenyl-propane. | | 142/0.2 | | (2,3-dimethoxy-phenyl)-dimethylamino-acetonitrile. | β-Phenyl-propyl bromide | 12 | 52 |
| 65 | 1-(2,3-dimethoxy-phenyl)-1-dimethyl-amino-4-phenyl-butane. | | 145/0.07 | | ___do___ | γ-Phenyl-propyl bromide. | 12 | 65 |
| 66 | 1-(2,3-dimethoxy-phenyl)-1-diethyl-amino-2-phenyl-ethane. | | 146/0.4 | 200–201 | (2,3-dimethoxy-phenyl)-diethyl-amino-acetonitrile. | Benzyl bromide. | 12 | 82 |
| 67 | 1-(2,3-dimethoxy-phenyl)-1-diethyl-amino-3-methyl-3-phenyl-propane. | | 144/0.25 | 170–171 | ___do___ | β-Phenyl-propyl bromide. | 12 | 76 |
| 68 | 1-(2,3-dimethyoxy-phenyl)-1-pyrrolidyl-3-phenyl-propane. | | 159–160/0.03 | 117–118 | (2,3-dimethoxy-phenyl)-pyrrolidyl-acetonitrile. | β Phenyl-ethyl bromide. | 13 | 60 |
| 69 | 1-(2,3-dimethoxy-phenyl)-1-pyrrolidyl-3-methyl-3-phenyl-propane. | | 169/0.4 | | ___do___ | β-Phenyl-propyl bromide. | 12 | 67 |
| 70 | 1-(2,3-dimethoxy-phenyl)-1-pyrrolidyl-4-phenyl-butane. | | 161/0.1 | 151–152 | ___do___ | γ-Phenyl-propyl-bromide. | 12 | 71 |
| 71 | 1-(2,3-dimethoxy-phenyl)-1-piperidyl-3-methyl-3-phenyl-propane. | | 173/0.3 | | (2,3-dimethoxy-phenyl)-piperidyl-acetonitrile. | β-Phenyl-propyl bromide. | 12 | 66 |
| 72 | 1-(2,3-dimethoxy-phenyl)-1-piperidyl-4-phenyl-butane. | | 176/0.25 | 157–158 | ___do___ | γ-Phenyl-propyl bromide. | 12 | 74 |
| 73 | 1-(2-ethoxy-3-methoxy-phenyl)-1-dimethyl-amino-2-phenyl-ethane. | | 152/0.5 | 147–148 | (2-ethoxy-3-methoxy-phenyl)-dimethyl-amino-acetonitrile. | Benzyl bromide. | 12 | 84 |
| 74 | 1-(2-ethoxy-3-methoxy-phenyl)-1-dimethyl-amino-3-methyl-3-phenyl-propane. | | 141–142/0.17 | | ___do___ | β phenyl-propyl bromide. | 12 | 83 |
| 75 | 1-(2-ethoxy-3-methoxy-phenyl)-1-dimethyl-amino-4-phenyl-butane. | | 172/0.2 | | ___do___ | γ-Phenyl-propyl bromide. | 12 | 67 |
| 76 | 1-(2-ethoxy-3-methoxy-phenyl)-1-diethyl-amino-2-phenyl-ethane. | | 145/0.25 | 202 | (2-ethoxy-3-methoxy-phenyl)-diethyl-amino-acetonitrile. | Benzyl bromide. | 12 | 81 |
| 77 | 1-(2-ethoxy-3-methoxy-phenyl)-1-diethyla-mino-2-p-tolyl-ethane. | | 141/0.1 | 201 | ___do___ | Xylyl bromide. | 12 | 57 |
| 78 | 1-(2-ethoxy-3-methoxy-phenyl)-1-diethyla-mino-3-methyl-3-phenyl-propane. | | 152/0.35 | | ___do___ | β-Phenyl-propyl bromide. | 12 | 76 |
| 79 | 1-(2-ethoxy-3-methoxy-phenyl)-1-pyrrolidyl-2-phenyl-ethane. | | 155/0.35 | 146 | (2-ethoxy-3-methoxy-phenyl)-pyrrolidyl-acetonitrile. | Benzyl bromide. | 12 | 63 |
| 80 | 1-(2-ethoxy-3-methoxy-phenyl)-1-diethyl-amino-4-phenyl-butane. | | 165/0.35 | | (2-ethoxy-3-methoxy-phenyl)-diethyl-amino-acetonitrile. | γ-Phenyl-propyl bromide. | 12 | 76 |
| 81 | 1-(2-ethoxy-3-methoxy-phenyl)-1-pyrrolidyl-3-methyl-3-phenyl-propane. | | 170/0.35 | | (2-ethoxy-3-methoxy-phenyl)-pyrrolidyl-acetonitrile. | β-Phenyl-propyl bromide. | 12 | 63 |
| 82 | 1-(2-ethoxy-3-methoxy-phenyl)-1-pyrrolidyl-4-phenyl-butane. | | 171/0.25 | 123 | ___do___ | γ-Phenyl-propyl bromide. | 12 | 70 |
| 83 | 1-(2-ethoxy-3-methoxy-phenyl)-1-piperidyl-3-methyl-3-phenyl-propane. | | 174/0.3 | | (2-ethoxy-3-methoxy-phenyl)-piperidyl-acetonitrile. | β-Phenyl-propyl bromide. | 12 | 63 |
| 84 | 1-(2-ethoxy-3-methoxy-phenyl)-1-piperidyl-4-phenyl-butane. | | 190/0.35 | 146 | ___do___ | γ-Phenyl-propyl bromide. | 12 | 65 |
| 85 | 1-(2-methoxy-phenyl)-1-dimethylamino-2-phenyl-ethane. | | 117/0.1 | 162 | (2-methoxy-phenyl)-dimethylamino-acetonitrile. | Benzyl bromide. | 12 | 70 |
| 86 | 1-(2-methoxy-phenyl)-1-dimethyl-amino-3-phenyl-propane. | | 138/0.45 | 117–118 | ___do___ | β-Phenyl-ethyl bromide. | 12 | 80 |
| 87 | 1-(2-methoxy-phenyl)-1-dimethyl-amino-3-methyl-3-phenyl-propane. | | 123/0.15 | | ___do___ | β-Bromo-propyl-benzene. | 12 | 71 |
| 88 | 1-(2-methoxy-phenyl)-1-diethyl-amino-3-methyl-3-phenyl-propane. | | 146–147/0.5 | | (2-methoxy-phenyl)-diethyl-acetonitrile. | ___do___ | 12 | 71 |
| 89 | 1-(2-methoxy-phenyl)-pyrrolidyl-2-phenyl-ethane. | | 144/0.45 | 129–130 | (2-methoxy-phenyl)-pyrrolidyl-aceto-nitrile. | Benzyl bromide. | 12 | 75 |
| 90 | 1-(2-methoxy-phenyl)-1-diethyl-amino-4-phenyl-butane. | | 153/0.4 | 111 | (2-methoxy-phenyl)-diethylamino-aceto-nitrile. | γ-Phenyl-propyl bromide. | 12 | 74 |

| Example No. | Tertiary amine produced | M.P., °C. | B.P., °C./mm. Hg | M.P. of hydrochloride, °C. | Acetonitrile reagent | Grignard reagent from magnesium and— | Reaction procedure as in Example No.— | Yield percent of theory |
|---|---|---|---|---|---|---|---|---|
| 91 | 1-(2-methoxy-phenyl)-1-piperidyl-2-p-tolyl-ethane. | | 158/0.4 | 134-135 (decomp.). | (2-methoxy-phenyl)-piperidyl-aceto-nitrile. | Xylyl bromide | 12 | 73 |
| 92 | 1-(2-ethoxy-phenyl)-1-dimethylamino-2-phenyl-ethane. | | 115/0.1 | 129-130 | (2-ethoxy-phenyl)-dimethylamino-acetonitrile. | Benzyl bromide | 12 | 64 |
| 93 | 1-(2-ethoxy-phenyl)-1-dimethylamino-3-methyl-3-phenyl-propane. | | 140/0.5 | | ----do---- | β-Bromo-propyl benzene. | 12 | 66 |
| 94 | 1-(2-ethoxy-phenyl)-1-dimethylamino-4-phenyl-butane. | | 145/0.35 | 120-121 | ----do---- | γ-Phenyl-propyl bromide. | 12 | 64 |
| 95 | 1-(2-ethoxy-phenyl)-1-diethylamino-3-methyl-3-phenyl-propane. | | 135/0.2 | | (2-ethoxy-phenyl)-diethylamino-acetonitrile. | β-Bromo-propyl benzene. | 12 | 84 |
| 96 | 1-(2-ethoxy-phenyl)-1-pyrrolidyl-2-phenyl-ethane. | | 145/0.4 | 153-154 | (2-ethoxy-phenyl)-pyrrolidyl-aceto-nitrile. | Benzyl bromide | 12 | 70 |
| 97 | 1-(2-n-propoxy-phenyl)-1-dimethyl-amino-3-phenyl-3-methyl-propane. | | 137/0.2 | | (2-n-propoxy-phenyl)-dimethyl-amino-acetonitrile. | β-Bromo-propyl benzene. | 12 | 66 |
| 98 | 1-(2-n-propoxy-phenyl)-1-dimethyl-amino-4-phenyl-butane. | | 153-154/0.3 | 119-120 | ----do---- | γ-Phenyl-propyl bromide. | 12 | 81 |
| 99 | 1-(2-n-propoxy-phenyl)-1-diethyl-amino-2-p-methoxy-phenyl-ethane. | | 172-173/0.3 | | (2-n-propoxy-phenyl)-diethyl-amino-acetonitrile. | p-(Methoxy-phenyl)-methyl bromide. | 15 | 25 |
| 100 | 1-(2-n-propoxy-phenyl)-1-pyrrolidyl-3-phenyl-propane. | | 160/0.2 | 108-109 | (2-n-propoxy-phenyl)-pyrrolidyl-aceto-nitrile. | β-Phenyl-ethyl bromide. | 12 | 76 |
| 101 | 1-(2-n-propoxy-phenyl)-1-piperidyl-2-phenyl-ethane. | | 165/0.45 | 156-157 | (2-n-propoxy-phenyl)-piperidyl-aceto-nitrile. | Benzyl bromide | 12 | 67 |
| 102 | 1-(2,3-dimethoxy-phenyl)-1-diethyl-amino-4-phenyl-butane. | | 155/0.15 | 113-114 | (2,3-dimethoxy-phenyl)-diethylamino-acetonitrile. | γ-Phenyl-propyl bromide. | 12 | 57 |
| 103 | 1-(2-ethoxy-phenyl)-1-diethylamino-4-phenyl-butane. | | 157/0.2 | | (2-ethoxy-phenyl)-diethylamino-acetonitrile. | ----do---- | 12 | 74 |
| 104 | 1-(2-ethoxy-phenyl)-1-pyrrolidyl-4-phenyl-butane. | | 175/0.1 | 108-110 | (2-ethoxy-phenyl)-pyrrolidyl-aceto-nitrile. | ----do---- | 12 | 60 |
| 105 | 1-(2-ethoxy-phenyl)-1-pyrrolidyl-3-methyl-3-phenyl-propane. | | 155/0.15 | | ----do---- | β-Phenyl-propyl bromide. | 12 | 78 |
| 106 | 1-(2-ethoxy-phenyl)-1-piperidyl-4-phenyl-butane. | | 178-179/0.15 | 134 | (2-ethoxy-phenyl)-piperidyl-aceto-nitrile. | γ-Phenyl-propyl bromide. | 12 | 79 |
| 107 | 1-(2-ethoxy-phenyl)-1-piperidyl-3-methyl-3-phenyl-propane. | | 169/0.07 | | ----do---- | β-Phenyl-propyl bromide. | 12 | 79 |
| 108 | 1-(2-n-propoxy-phenyl)-1-diethyl-amino-4-phenyl-butane. | | 164/0.4 | | (2-n-propoxy-phenyl)-diethyl-amino-acetonitrile. | γ-Phenyl-propyl bromide. | 12 | 64 |
| 109 | 1-(2-n-propoxy-phenyl)-1-diethyl-amino-3-methyl-3-phenyl-propane. | | 152/0.4 | | ----do---- | β-Phenyl-propyl bromide. | 12 | 82 |
| 110 | 1-(2-n-propoxy-phenyl)-1-pyrrolidyl-4-phenyl-butane. | | 174/0.2 | 110-111 | (2-n-propoxy-phenyl)-pyrrolidyl-acetonitrile. | γ-Phenyl-propyl bromide. | 12 | 69 |
| 111 | 1-(2-n-propoxy-phenyl)-1-pyrrolidyl-3-methyl-3-phenyl-propane. | | 172-175/0.3 | | ----do---- | β-Phenyl-propyl bromide. | 12 | 80 |
| 112 | 1-(2-n-propoxy-phenyl)-1-piperidyl-4-phenyl-butane. | | 176-178/0.25 | | (2-n-propoxy-phenyl)-piperidyl-acetonitrile. | γ-Phenyl-propyl bromide. | 12 | 69 |
| 113 | 1-(2-n-propoxy-phenyl)-1-piperidyl-3-methyl-3-phenyl-propane. | | 170/0.25 | | ----do---- | β-Phenyl-propyl bromide. | 12 | 64 |

As previously stated and illustrated in the preceding examples, the tertiary amines of the present invention are in many cases water-insoluble oils. It is, therefore, often convenient to use them pharmacologically and therapeutically as the more water-soluble acid addition salts derived from non-toxic inorganic or organic acids or in the form of quaternary ammonium salts derived from alkyl, aralkyl or cycloalkyl halogenides, dialkyl sulfates or p-toluene sulfonic acid alkyl esters.

Typical examples of pharmacologically useful non-toxic acid addition salts of the present tertiary amines are those formed with hydrochloric acid, hydrobromic acid, sulfuric acid, phosphoric acid, nitric acid, acetic acid, propionic acid, butyric acid, valeric acid, oxalic acid, malonic acid, succinic acid, maleic acid, fumaric acid, lactic acid, tartaric acid, citric acid, malic acid, benzoic acid, phthalic acid, cinnamic acid, salicylic acid, nicotinic acid, 2-furoic acid and the like. The hydrochlorides, however, have been found to be particularly suitable for practical purposes.

Typical examples of pharmacologically useful, non-toxic quaternary compounds of the present tertiary amines are those formed with methyl iodide, methyl bromide, benzyl bromide, ethyl iodide, isobutyl bromide and other alkyl chlorides, bromides or iodides, dimethyl sulfate, diethyl sulfate, p-toluene sulfonic acid alkyl esters, cyclohexyl chlorides, bromides or iodides, cyclopentyl chlorides, bromides, or iodides, and the like, in accordance with customary quaternizing procedures such as those illustrated in the preceding examples.

The group of compounds embraced by Formulas I and II above are useful and effective pharmacological agents. More particularly, they exhibit papaverine-like myotopic spasmolytic activities. In addition, certain compounds of this group possess other desirable pharmacological properties in addition to being spasmolytics, such as hypotensive, vasodilating and local anesthetic activities.

These pharmacological properties of the compounds according to the present invention are quite unlike those of related primary and secondary amines, and even diametrically opposed to those of related tertiary amines. Thus, it is known that primary diphenyl-ethylamines wherein one of the phenyl radicals is di-substituted exhibit primarily analgesic properties, as do secondary diphenyl-ethylamines. It is therefore a surprising and unexpected discovery that related tertiary amines exhibit primarily myotropic spasmolytic properties. Moreover, it is known that tertiary amines with a terminal amino group exhibit uterotonic properties, whereas some of the compounds of the present invention exhibit exactly the opposite properties, namely a specific utero-spasmolytic effect.

To demonstrate the surprisingly effective and versatile pharmacological properties of the tertiary amines according to the present invention the following tests were made: 1 - (3,4 - dimethoxy phenyl)-1-dimethylamino-4-phenyl butane hydrochloride showed in a dose of 5 mg./kg. intravenously administered to rabbits a spasmolytic activity which corresponds to but lasted about twice as long as that of papaverine administered in the same dose and manner. This test was carried out by flowing an 0.01% solution of barium chloride through the abdominal cavity of a living rabbit as described by Brock et al. in "Arch. Exp. Path & Pharm.," vol. 215, page 492 (1952) and recording the movement of the intestines according to the method of W. Straub.

Said compound was found to be 50% more effective than papaverine in releasing spasms of the rat uterus in situ which were caused by barium chloride. The dilating effect on the coronary blood-vessels was measured on dogs by means of the bubble-flow method described by Eckenhoff et al. in "Am. J. Physiol.," vol. 148, page 582 (1947). This effect as well as the blood pressure lowering effects in cats were also 25% greater than those of papaverine given in the same dose.

Furthermore, 1-(3.4-dimethoxy phenyl)-1-dimethylamino-4-phenyl butane hydrochloride is distinguished by a low toxicity. Its $LD_{50}$ is 500 mg./kg. given perorally to rats and 320 mg./kg. on subcutaneous injection.

The compound has the further advantage over papaverine and other spasmolytic agents of papaverine-like activity that it is readily water soluble and is locally well tolerated, also on parenteral administration to humans.

1 - (3,4-dimethoxy-phenyl)-1-dimethylamino-4-phenyl-butane hydrochloride has also been used clinically as uterine spasmolytic agent for some years. It effects a considerable accleration of birth without side effects being observed until now. Above all the circulatory system is not affected.

The spasmolytic activity of 1-(3,4-diethoxyphenyl)-1-diethylamino-4-phenyl-butane hydrochloride was tested in situ on the rat uterus, using the experimental arrangement of Engelhorn and Schmidt [Arzneimittelforschung, vol. 6 (1956), pages 454–457], and compared to the analogous spasmolytic activity of papaverine, a standard effective myotropic spasmolytic agent. It was found that the compound of the invention is 1.5 times more active as a spasmolytic than papaverine. Substantially the same spasmolytic activity was exhibited by the hydrochlorides of the following compounds:

1-(3,4-diethoxy-phenyl)-1-dimethylamino-4-phenyl-butane
1-(4-ethoxy-3-methoxy-phenyl)-1-dimethylamino-3-methyl-3-phenyl-propane
1-(4-ethoxy-3-methoxy-phenyl)-1-diethylamino-4-phenyl-butane
1-(4-methoxy-3-methyl-phenyl)-1-dimethylamino-3-phenyl-propane
1-(4-methoxy-3-ethoxy-phenyl)-1-dimethylamino-3-methyl-3-phenyl-propane
1-(4-methoxy-3-ethoxy-phenyl)-1-diethylamino-4-phenyl-butane
1-(4-methoxy-3-ethoxy-phenyl)-1-diethylamino-3-methyl-3-phenyl-propane.

In another comparative test, using the experimental arrangement of Magnus [Pflugers Archiv, vol. 102 (1904), page 123], the spasmolytic activity of 1-(4-methoxy - 3 - methyl-phenyl)-1-dimethylamino-3-methyl-3-phenyl-propane hydrochloride was found to be twice as great than papaverine in suppressing spasms of the isolated guinea pig colon induced with barium chloride. In tests on cats it was also found that this compound was twice as effective as papaverine in lowering the blood pressure; i.e. when administered in equal doses 1-(4-methoxy - 3 - methyl-phenyl)-1-dimethylamino-3-methyl-3-phenyl-propane hydrochloride lowered the blood pressure twice as much as papaverine. Similarly, using the experimental arrangement of Bornstein [Naunyn-Schmiedebergs Archiv, vol. 115 (1926), page 367], it was found in tests on cats that the vasodilating effect of the compound was five times greater than that of papaverine when administered in equal doses.

Using the method of Magnus (loc. cit.), it was also determined that 1-(4-ethoxy-3-methoxy-phenyl)-1-dimethylamino-4-phenyl-butane hydrochloride is 1.5 times more active as a spasmolytic than papaverine, as determined on the isolated guinea pig colon. The vasodilating activity of the compound was found to be substantially equal to that of papaverine, as determined on an isolated rabbit ear by the method of Krawkow and Pissemski (Ther., Pharmakol. Methoden, page 193).

The following table shows additional comparative values of relative spasmolytic activity between various tertiary amine compounds according to the present invention and papaverine. For the purpose of these tests the relative spasmolytic activity of papaverine hydrochloride was designated as being 1.0. These values were obtained by comparative tests on isolated guinea pig colons wherein spasms were induced with barium chloride. The testing procedure used to determine these values was that of Magnus (loc. cit.).

TABLE I

| Compound (as hydrochloride): | Relative spasmolytic activity |
|---|---|
| Papaverine | 1.0 |
| 1 - (3,4 - diethoxy - phenyl) - 1-di-ethylamino-4-phenyl-butane | 2.0 |
| 1-(4-n-propoxy-3-methoxy-phenyl) - 1 - dimethylamino-3-phenyl-propane | 1.3 |
| 1 - (4 - methoxy-3-methyl-phenyl)-1-piperidyl-2-phenyl-ethane | 1.0 |
| 1-(3,4-diethoxy-phenyl)-1 - dimethylamino - 2-phenyl-ethane | 1.0 |
| 1 - (3,4 - diethoxy - phenyl)-1-diethylamino-3-methyl-3-phenyl-propane | 2.0 |
| 1-(4-n-butoxy-3-methoxy - phenyl) - 1 - dimethylamino-4-phenyl-butane | 1.0 |
| 1 - (4 - methoxy-3-methyl-phenyl)-1-dimethylamino-3-phenyl-propane | 1.4 |
| 1-(4-methoxy-3-methyl-phenyl) - 1 - dimethylamino-2-phenyl-ethane | 1.0 |
| 1 - (4 - methoxy-3-methyl-phenyl)-1-pyrrolidyl-2-phenyl-ethane | 1.0 |
| 1-(4-ethoxy-3-methoxy-phenyl) - 1 - pyrrolidyl-4-phenyl-butane | 1.3 |
| 1 - (4 - ethoxy-3-methoxy-phenyl)-1-piperidyl-4-phenyl-butane | 1.0 |
| 1-(2-ethoxy-3-methoxy-phenyl) - 1 - dimethylamino-4-phenyl-butane | 1.0 |
| 1 - (2 - ethoxy - 3 - methoxy-phenyl)-1-diethylamino-3-methyl-3-phenyl-propane | 1.0 |
| 1-(2,3-dimethoxy-phenyl) - 1 - dimethylamino-4-phenyl-butane | 0.8 |

TABLE I—Continued

| Compound (as hydrochloride): | Relative spasmolytic activity |
|---|---|
| 1-(2-methoxy-phenyl)-1-dimethylamino-4-phenyl-butane | 1.0 |
| 1-(2-methoxy-phenyl)-1-dimethylamino-3-methyl-3-phenyl-propane | 1.0 |
| 1-(2,3-dimethoxy-phenyl)-1-dimethylamino-3-methyl-3-phenyl-propane | 0.8 |

The following table shows the results of comparative tests between various compounds of the present invention and papaverine with respect to their hypotensive, i.e. blood pressure reducing, activities. The compounds in question were administered to cats intravenously in a dose of 1 mg. per kg. body weight and the maximum reduction of the blood pressure produced by such administration was measured in each case.

TABLE II

| Compound (as hydrochloride): | Maximum reduction of blood pressure, mm. Hg |
|---|---|
| Papaverine | 35 |
| 1-(3,4-diethoxy-phenyl)-1-dimethylamino-3-methyl-3-phenyl-propane | 40 |
| 1-(4-ethoxy-3-methoxy-phenyl)-1-diethylamino-4-phenyl-butane | 45 |
| 1-(4-ethoxy-3-methoxy-phenyl)-1-piperidyl-3-methyl-3-phenyl-propane | 45 |
| 1-(4-methoxy-3-methyl-phenyl)-1-dimethylamino-3-phenyl-propane | 50 |
| 1-(4-methoxy-3-ethoxy-phenyl)-1-dimethylamino-3-methyl-3-phenyl-propane | 45 |
| 1-(4-methoxy-3-ethoxy-phenyl)-1-diethylamino-4-phenyl-butane | 54 |
| 1-(4-methoxy-3-ethoxy-phenyl)-1-diethylamino-3-methyl-3-phenyl-propane | 47 |
| 1-(3,4-diethoxy-phenyl)-1-dimethylamino-2-phenyl-ethane | 35 |
| 1-(4-methoxy-3-methyl-phenyl)-1-diethylamino-4-phenyl-butane | 35 |
| 1-(3,4-diethoxy-phenyl)-1-diethylamino-3-methyl-3-phenyl-propane | 45 |
| 1-(4-methoxy-3-ethoxy-phenyl)-1-dimethylamino-4-phenyl-butane | 50 |
| 1-(3,4-diethoxy-phenyl)-1-diethylamino-3-phenyl-propane | 55 |
| 1-(2-ethoxy-3-methoxy-phenyl)-1-dimethylamino-4-phenyl-butane | 53 |
| 1-(2-ethoxy-3-methoxy-phenyl)-1-diethylamino-3-methyl-3-phenyl-propane | 50 |
| 1-(2,3-dimethoxy-phenyl)-1-dimethylamino-4-phenyl-butane | 33 |
| 1-(2-methoxy-phenyl)-1-dimethylamino-4-phenyl-butane | 40 |
| 1-(2-methoxy-phenyl)-1-dimethylamino-3-methyl-3-phenyl-propane | 37 |
| 1-(2,3-dimethoxy-phenyl)-1-dimethylamino-3-methyl-3-phenyl-propane | 30 |

Another surprising and useful property of certain compounds according to the present invention is the local anesthetic activity of those compounds having a lower alkoxy group attached to the phenyl radical which is attached to the carbon atom carrying the tertiary amino group. To demonstrate this surprising property, certain representative members of this group of compounds were subjected to comparative test with papaverine, using the method of Sollmann [Journal of Pharmacology, vol. 11, page 17 (1918)]. This test method comprises, in principle, placing a 1% aqueous solution of the compound in question on the cornea of the eye of a rabbit or similar test animal, and measuring the time during which there is no cornea reflex action. The following table shows the results of these tests.

TABLE III

| Compound (as hydrochloride): | Time period of absence of cornea reflex (minutes) |
|---|---|
| Papaverine | 0 |
| 1-(2-ethoxy-3-methoxy-phenyl)-1-dimethylamino-4-phenyl-butane | 120 |
| 1-(2-ethoxy-3-methoxy-phenyl)-1-diethylamino-3-methyl-3-phenyl-propane | 15 |
| 1-(2,3-dimethoxy-phenyl)-1-dimethylamino-4-phenyl-butane | 120 |
| 1-(2-methoxy-phenyl)-1-di-methylamino-4-phenyl-butane | 60 |
| 1-(2-methoxy-phenyl)-1-di-methylamino-3-methyl-3-phenyl-propane | 20 |
| 1-(2,3-dimethoxy-phenyl)-1-dimethylamino-3-methyl-3-phenyl-propane | 90 |

In addition, the 2-alkoxy-substituted compounds, administered in doses of 10γ to 20γ, increase the flow of liquid through an isolated guinea pig heart, as determined by the method of Langendorff [Pflugers Archiv, vol. 61 (1895), page 219] modified by Burn (Practical Pharmacology, Blackwell, Oxford, 1952, page 25).

Finally, 1-(2-n-propoxy-phenyl)-1-diethylamino-3-methyl-3-phenyl-propane hydrochloride was found to be spasmolytically 1.2 times more active than papaverine in an isolated guinea pig colon wherein spasms had been artificially induced with barium chloride. The compound was also twice as effective in dilating the arteria femoralis of anesthetized dogs than papaverine. Measurement of the coronary blood flow in dogs by the bubble-flow method also showed that this compound was 50% more effective than papaverine in its coronary dilating activity.

The data cited above make it abundantly clear that the compounds of the present invention have useful and effective pharmacological properties which are at least equal to and in many cases exceed the corresponding properties of the most common related pharmacological agent, papaverine. One specific group of these compounds even exhibits pharmacological properties which papaverine does not have at all, namely local anesthetic activity.

While we have illustrated the present invention with the aid of certain specific embodiments thereof, it will be readily apparent to those skilled in the art that the invention is not limited to these embodiments, and that various changes and modifications may be made without departing from the spirit of the invention or the scope of the appended claims.

We claim:

1. 1-(4-ethoxy-3-methoxy-phenyl)-1-dimethylamino-4-phenyl-butane.
2. 1-(3,4-diethoxy-phenyl)-1-diethylamino-4-phenyl-butane.
3. 1-(4-methoxy-3-ethoxy-phenyl)-1-diethylamino-3-methyl-3-phenyl-propane.
4. 1-(3,4-dimethoxy-phenyl)-1-dimethylamino-4-phenyl-butane.
5. 1-(3,4-dimethoxy-phenyl)-1-dimethylamino-3-methyl 3-phenyl-propane.
6. 1-(3,4-dimethoxy-phenyl)-1-diethylamino-4-phenyl-butane.

References Cited in the file of this patent

UNITED STATES PATENTS

| 2,276,587 | Mettler et al. | Mar. 17, 1942 |
| 2,503,285 | McPhee | Apr. 11, 1950 |
| 2,504,122 | Goodson et al. | Apr. 18, 1950 |
| 2,711,428 | Goodson et al. | June 21, 1955 |

(Other references on following page)

FOREIGN PATENTS

| | | |
|---|---|---|
| 536,881 | Great Britain | May 30, 1941 |
| 963,424 | Germany | May 9, 1957 |
| 1,008,740 | Germany | May 23, 1957 |
| 1,011,427 | Germany | July 4, 1957 |

OTHER REFERENCES

Wittig et al.: Justus Liebig's Annalen, vol. 560, page 117 (1948).

Goodson: Journal of the American Chemical Society, vol. 72, pages 360–362 (1950).

Beilstein's Handbuch der Organischen Chemie, vol. 13 (2nd supplement), page 424 (1950).

Lettre et al.: Hoppe Seyler's Zeitschrift für Physiologische Chemie, vol. 291, page 165 relied on (1952).

Heinzelman et al.: Journal of the American Chemical Society, vol. 75, page 3410 relied on (1953).